United States Patent
Osburn et al.

(10) Patent No.: US 8,201,442 B2
(45) Date of Patent: Jun. 19, 2012

(54) SYSTEM AND METHOD FOR ESTIMATING EGR MASS FLOW RATES

(75) Inventors: Andrew W. Osburn, Nashville, IN (US); Martin T. Books, Columbus, IN (US); Richard E. Reisinger, Columbus, IN (US); Albert E. Sisson, Columbus, IN (US)

(73) Assignee: Cummins Inc., Columbus, IN (US)

( * ) Notice: Subject to any disclaimer, the term of this patent is extended or adjusted under 35 U.S.C. 154(b) by 399 days.

(21) Appl. No.: 12/567,284

(22) Filed: Sep. 25, 2009

(65) Prior Publication Data
US 2011/0072911 A1 Mar. 31, 2011

(51) Int. Cl.
  *G01M 15/10* (2006.01)
(52) U.S. Cl. .................................................. 73/114.74
(58) Field of Classification Search ............... 73/114.31, 73/114.32, 114.33, 114.34, 114.37, 114.69, 73/114.74, 114.76
See application file for complete search history.

(56) References Cited

U.S. PATENT DOCUMENTS

| | | | |
|---|---|---|---|
| 4,807,151 A | 2/1989 | Citron | |
| 5,190,017 A | 3/1993 | Cullen et al. | |
| 5,301,126 A | 4/1994 | Nishimura et al. | |
| 5,546,915 A | 8/1996 | Isobe | |
| 5,921,224 A | 7/1999 | Sinnamon | |
| 5,970,961 A | 10/1999 | Kotwicki et al. | |
| 5,974,870 A | 11/1999 | Treinies et al. | |
| 5,988,149 A | 11/1999 | Gates | |
| 6,012,437 A | 1/2000 | Radhamohan et al. | |
| 6,019,094 A | 2/2000 | Itoyama | |
| 6,032,656 A | 3/2000 | Itoyama et al. | |
| 6,035,639 A | 3/2000 | Kolmanovsky | |
| 6,085,732 A | 7/2000 | Wang et al. | |
| 6,098,602 A | 8/2000 | Martin et al. | |
| 6,112,729 A | 9/2000 | Barnes et al. | |
| 6,115,664 A | 9/2000 | Cullen et al. | |
| 6,125,830 A | 10/2000 | Kotwicki et al. | |
| 6,128,902 A | 10/2000 | Kolmanovsky et al. | |
| 6,164,071 A | 12/2000 | Shao et al. | |
| 6,164,270 A | 12/2000 | Bidner et al. | |
| 6,170,476 B1 | 1/2001 | Cook et al. | |
| 6,182,644 B1 | 2/2001 | Kotwicki et al. | |
| 6,189,520 B1 | 2/2001 | Cook et al. | |
| 6,216,458 B1 | 4/2001 | Alger et al. | |
| 6,216,461 B1 | 4/2001 | Shao et al. | |
| 6,227,182 B1 | 5/2001 | Muraki et al. | |
| 6,253,749 B1 | 7/2001 | Kotwicki et al. | |
| 6,363,922 B1 | 4/2002 | Romzek et al. | |

(Continued)

OTHER PUBLICATIONS

PCT Search Report and Written Opinion for International Application No. PCT/US2010/049673 dated Apr. 28, 2011 (8 pages).

*Primary Examiner* — Eric S McCall
(74) *Attorney, Agent, or Firm* — Barnes & Thornburg LLP (57) ABSTRACT

A system and method are provided for estimating an instantaneous EGR mass flow rate corresponding to a flow rate of exhaust gas through an exhaust gas recirculation (EGR) conduit fluidly coupled between an exhaust manifold and an intake manifold of an internal combustion engine with an EGR cooler positioned in-line with the EGR conduit. An operating position of the engine is monitored, and the instantaneous EGR mass flow rate is estimated at each of a plurality of fixed increments of the engine position based on EGR cooler outlet temperature, intake manifold pressure and a pressure differential across a flow restriction disposed in-line with the exhaust gas conduit between the EGR cooler and the intake manifold.

18 Claims, 3 Drawing Sheets

U.S. PATENT DOCUMENTS

| | | |
|---|---|---|
| 6,505,519 B2 | 1/2003 | Henry et al. |
| 6,588,210 B2 | 7/2003 | Kreso |
| 6,609,058 B1 | 8/2003 | Russell et al. |
| 6,742,335 B2 | 6/2004 | Beck et al. |
| 6,763,708 B2 | 7/2004 | Ting et al. |
| 6,820,600 B1 | 11/2004 | Sisken et al. |
| 6,848,434 B2 | 2/2005 | Li et al. |
| 6,850,833 B1 | 2/2005 | Wang et al. |
| 6,850,834 B1 | 2/2005 | Yu et al. |
| 6,944,530 B2 | 9/2005 | Russell et al. |
| 6,980,903 B2 | 12/2005 | Daniels et al. |
| 6,993,909 B2 * | 2/2006 | Matsunaga et al. .......... 60/605.2 |
| 7,062,910 B2 | 6/2006 | Inoue |
| 7,938,105 B2 * | 5/2011 | Gates et al. .............. 123/568.12 |
| 2003/0029233 A1 | 2/2003 | Ting et al. |
| 2008/0163855 A1 | 7/2008 | Matthews et al. |

* cited by examiner

SYSTEM AND METHOD FOR ESTIMATING EGR MASS FLOW RATES

FIELD OF THE INVENTION

The present invention relates generally to internal combustion engines including an exhaust gas recirculation (EGR) system, and more specifically to systems and methods for determining the mass flow rate of exhaust gas through such an EGR system, i.e., for determining EGR mass flow rates.

BACKGROUND

When combustion occurs in an environment with excess oxygen, peak combustion temperatures increase which leads to the formation of unwanted engine emissions, such as oxides of nitrogen, e.g., NOx. One conventional way of reducing such unwanted emissions is to direct some of the exhaust gas produced by the engine back into the air charge that will be combusted by the engine via a so-called exhaust gas recirculation (EGR) system.

In conventional EGR systems EGR mass flow rate may typically be estimated as a function of the square root of an average delta pressure across a flow restriction orifice in-line with an EGR conduit connected between the exhaust manifold and the intake manifold of the engine. Under steady state, e.g. constant, EGR flow conditions the conventional EGR flow rate estimation technique can produce accurate results. However, under transient engine operating conditions inaccuracies arise in the conventional EGR mass flow rate estimation process just described due to the pulsating nature of EGR flow under such transient operating conditions. Under such transient operating conditions, the average value of the EGR mass flow rate cannot be accurately computed from the average delta pressure value due to the inherent non-linearity associated with the square root term. It is accordingly desirable to be able to estimate instantaneous mass flow rates of exhaust gas through such an EGR system for more accurate diagnostic and/or engine control purposes.

SUMMARY

The present invention may comprise one or more of the features recited in the attached claims, and/or one or more of the following features and combinations thereof. A method is provided for estimating an instantaneous flow rate of exhaust gas through an exhaust gas recirculation (EGR) conduit fluidly coupled between an exhaust manifold and an intake manifold of an internal combustion engine, wherein the EGR conduit includes an EGR cooler disposed in-line therewith. The method may comprise monitoring an operating position of the engine, and executing the following steps at each of a plurality of fixed increments of the engine position, sampling an EGR cooler outlet temperature corresponding to a temperature of gas exiting a gas outlet of the EGR cooler, sampling a pressure differential across a flow restriction disposed in-line with the exhaust gas conduit between the EGR cooler and the intake manifold, sampling an intake manifold pressure corresponding to fluid pressure within the intake manifold, estimating the instantaneous mass flow rate of exhaust gas through the EGR conduit based on the sampled pressure differential, the EGR cooler outlet temperature and the intake manifold pressure, and storing the estimated instantaneous mass flow rate of exhaust gas in a memory unit.

The fixed increments may be selected such that the sampling of the EGR cooler outlet temperature, the pressure differential across the flow restriction and the intake manifold pressure occur at least 8-10 times faster than a firing cycle of the engine.

The method may further comprise determining an average EGR mass flow rate by averaging a number of values of the estimated instantaneous mass flow rate of exhaust gas through the EGR conduit. The method may further comprise storing the average EGR mass flow rate in the memory unit.

The method may further comprise estimating the instantaneous mass flow rate of exhaust gas through the EGR conduit based on an instantaneous EGR mass flow rate model that includes a number of model constants.

In one embodiment, the instantaneous EGR mass flow rate model may be $EGRFR = [C_D * A_{FR} * \text{sqrt}[(2*\Delta P*IMP/(R*COT)]/\text{sqrt}[1-(A_{FR}/A_U)^2]$, where EGRFR is the instantaneous mass flow rate of exhaust gas through the EGR conduit, COT is the EGR cooler outlet temperature, $\Delta P$ is the pressure differential across the flow restriction, IMP is the intake manifold pressure, and $C_D$, $A_{FR}$, R and $A_U$ comprise the number of model constants. $C_D$ may be a charge density value, $A_{FR}$ may be a cross-sectional flow area of the flow restriction, $A_U$ may be a cross-sectional area of the EGR conduit and R may be a gas constant. In an alternative embodiment, the instantaneous EGR mass flow rate model may be $EGRFR = [C_D * A_T * (IMP-\Delta P)/\text{sqrt}(R*COT)] * [\Delta P^{1/\gamma}] * \text{sqrt}\{[2*\gamma/(\gamma-1)] * [1-\Delta P^{(\gamma-1)}]\}$, where EGRFR is the instantaneous mass flow rate of exhaust gas through the EGR conduit, COT is the EGR cooler outlet temperature, $\Delta P$ is the pressure differential across the flow restriction, IMP is the intake manifold pressure, and $C_D$, $A_T$, R and $\gamma$ comprise the number of model constants. In this embodiment, $C_D$ may be a charge density value, $A_T$ may be a cross-sectional flow area of the flow restriction, R may be a gas constant and $\gamma$ may be a ratio of specific heat capacity at constant pressure to specific heat capacity at constant volume for a cylinder charge.

A system for estimating an instantaneous flow rate of exhaust gas through an exhaust gas recirculation (EGR) conduit fluidly coupled between an exhaust manifold and an intake manifold of an internal combustion engine may comprise an EGR cooler disposed in-line with the EGR conduit, a temperature sensor configured to produce a temperature signal corresponding to a temperature of exhaust gas exiting the EGR cooler, a flow restriction disposed in-line with the EGR conduit between a gas outlet of the EGR cooler and the intake manifold of the engine, a differential pressure sensor fluidly configured to produce a differential pressure signal corresponding to a differential pressure across the flow restriction, a pressure sensor configured to produce a pressure signal corresponding to a pressure within the intake manifold of the engine, an engine position sensor configured to produce an engine position signal that corresponds to engine position relative to a reference position, and a control circuit including a memory having instructions stored therein that are executable by the control circuit to monitor the engine position signal and estimate at each of a plurality of fixed increments of the engine position the instantaneous mass flow rate of exhaust gas through the EGR conduit based on the temperature signal, the differential pressure signal and the pressure signal.

The instructions stored in the memory may include instructions that are executable by the control circuit to store the estimated instantaneous mass flow rate in the memory.

The instructions stored in the memory may include instructions that are executable by the control circuit to compute an average EGR mass flow rate value based on a number of most recently estimated values of the instantaneous mass flow rate of exhaust gas through the EGR conduit. The instructions stored in the memory may further include instructions that are executable by the control circuit to store the average EGR mass flow rate value in the memory.

The differential pressure sensor may be configured to sample the pressure differential across the flow restriction at a sampling rate that is at least 8-10 times faster than a firing cycle of the engine over a full range of engine rotational speeds.

In one embodiment, the instructions stored in the memory may include instructions that are executable by the control circuit to estimate the instantaneous mass flow rate of exhaust gas through the EGR conduit according to the equation $EGRFR=[C_D*A_{FR}*sqrt[(2*\Delta P*IMP/(R*COT)]/sqrt[1-(A_{FR}/A_U)^2]$, where EGRFR is the instantaneous mass flow rate of exhaust gas through the EGR conduit, COT is the EGR cooler outlet temperature, $\Delta P$ is the pressure differential across the flow restriction, IMP is the intake manifold pressure, and $C_D$, $A_{FR}$, R and $A_U$ are constants. $C_D$ may be a charge density value, $A_{FR}$ may be a cross-sectional flow area of the flow restriction, $A_U$ may be a cross-sectional area of the EGR conduit and R may be a gas constant. Alternatively, the instructions stored in the memory may include instructions that are executable by the control circuit to estimate the instantaneous mass flow rate of exhaust gas through the EGR conduit according to the equation $EGRFR=[C_D*A_T*(IMP-\Delta P)/sqrt(R*COT)]*[\Delta P^{1/\gamma}]*sqrt\{[2*\gamma/(\gamma-1)]*[1-\Delta P]^{(\gamma-1)}\}$, where EGRFR is the instantaneous mass flow rate of exhaust gas through the EGR conduit, COT is the EGR cooler outlet temperature, $\Delta P$ is the pressure differential across the flow restriction, IMP is the intake manifold pressure, and $C_D$, $A_T$, R and $\gamma$ are constants. $C_D$ may be a charge density value, $A_T$ may be a cross-sectional flow area of the flow restriction, R may be a gas constant, and $\gamma$ may be a ratio of specific heat capacity at constant pressure to specific heat capacity at constant volume for a cylinder charge. In either case, the constants may be stored in the memory unit, and the instructions stored in the memory may further include instructions that are executable by the control circuit to retrieve the constants from the memory unit prior to estimating the instantaneous flow rate of exhaust gas through the EGR conduit.

DESCRIPTION OF THE ILLUSTRATIVE EMBODIMENTS

For the purposes of promoting an understanding of the principles of the invention, reference will now be made to one or more illustrative embodiments shown in the attached drawings and specific language will be used to describe the same.

Figure 1:
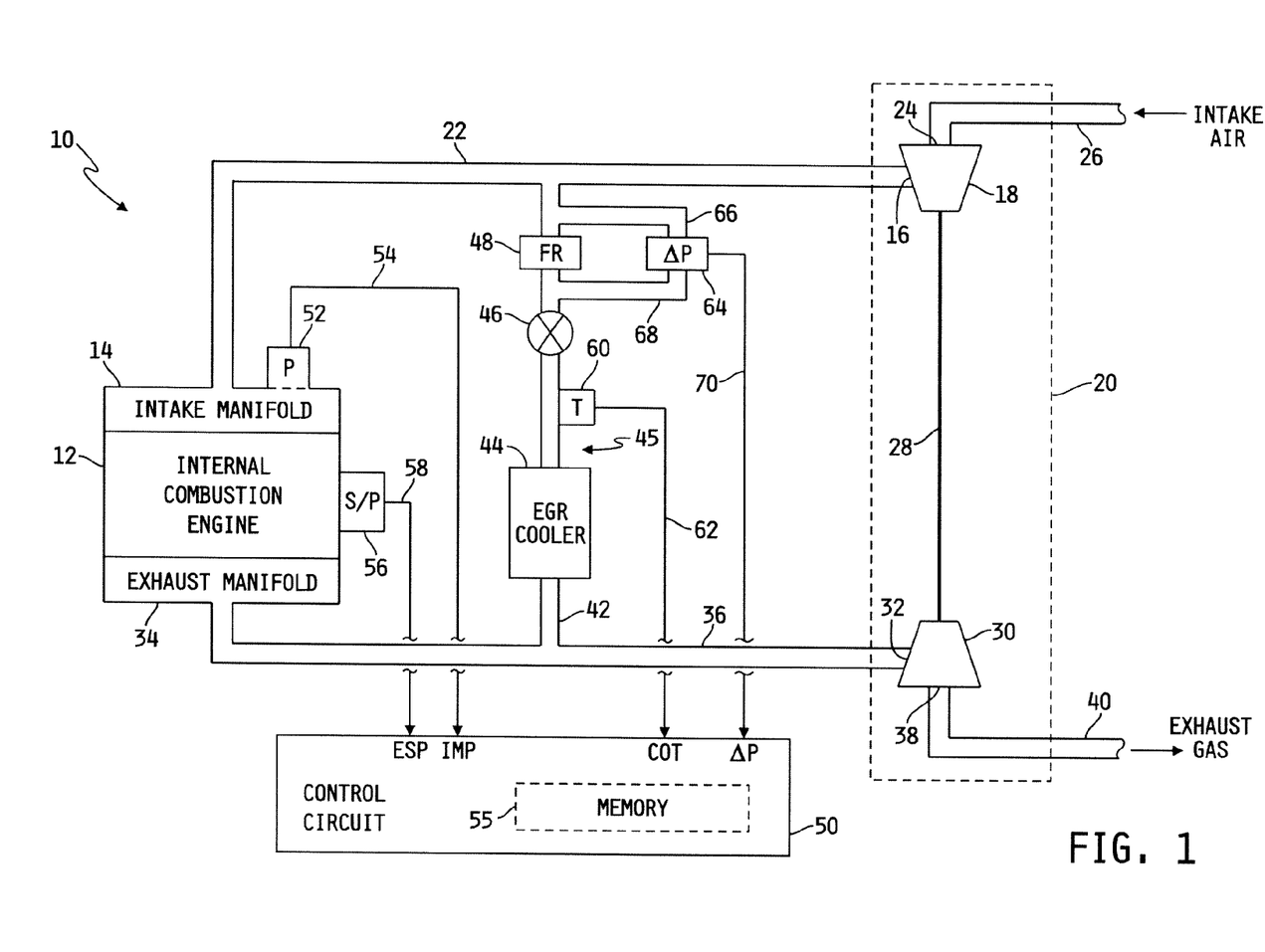
FIG. 1 is a block diagram of one illustrative embodiment of a system for estimating EGR mass flow rates.

Referring now to FIG. 1, a diagrammatic illustration of one illustrative embodiment of a system 10 for estimating EGR mass flow rates is shown. In the illustrated embodiment, the system 10 includes an internal combustion engine 12 having an intake manifold 14 fluidly coupled to an outlet 16 of a compressor 18 via a turbocharger 20 via an intake conduit 22. The compressor 16 includes a compressor inlet 24 coupled to an intake conduit 26 for receiving fresh air. In some embodiments, although not shown in FIG. 1, the system 10 may include an intake air cooler of known construction disposed in line with intake conduit 22 between the turbocharger compressor 18 and the intake manifold 14 of the engine 12.

The turbocharger compressor 18 is mechanically coupled to a turbocharger turbine 30 via a rotatable drive shaft 28, and the turbine 30 includes a turbine inlet 32 fluidly coupled to an exhaust manifold 34 of engine 12 via an exhaust conduit 36. The turbine 30 further includes a turbine outlet 38 fluidly coupled to ambient via an exhaust conduit 40.

In the embodiment illustrated in FIG. 1, the system 10 further includes an exhaust gas recirculation (EGR) system 45 including an EGR cooler 44 disposed in-line with an EGR conduit 42 that is fluidly coupled at one end to the intake conduit 22 and an opposite end to the exhaust conduit 36. The EGR system 45 further illustratively includes a conventional EGR valve 46 disposed in-line with the EGR conduit between the EGR cooler 44 and the intake conduit 22. The EGR valve 46 is illustratively controllable in a conventional manner to selectively control the flow of exhaust gas through the EGR conduit 42.

In the illustrated embodiment, the EGR system 45 further includes a flow restriction 48 (FR) disposed in-line with the EGR conduit 42 between the EGR valve 46 and the intake conduit 22 in embodiments that include the EGR valve 46, or between the EGR cooler 44 and the intake conduit 22 in embodiments that do not include an EGR valve 46. Alternatively, the flow restriction 48 may be positioned between the EGR cooler 44 and the EGR valve 46 in embodiments that include the EGR valve 46. In the illustrated embodiment, the flow restriction 48 is provided in the form of a portion of the EGR conduit 42 that has a reduced, fixed cross-sectional area that is less than that of the cross-sectional area of the EGR conduit 42 upstream and downstream of the flow restriction 48. Alternatively, the flow restriction 48 may be provided in the form of an orifice or other conventional exhaust gas flow reducing structure. Alternatively still, the flow restriction 48 may be the EGR valve 46. In this embodiment, the cross-sectional flow area of the EGR valve 46 is less than that of the EGR conduit 42, thereby restricting the flow of exhaust gas through the EGR conduit 42, and the flow restriction 48 illustrated in FIG. 1 may be omitted in this alternative embodiment.

The system 10 further includes a control circuit 50 that is generally operable to control and manage the overall operation of the engine 12. The control circuit 50 includes a memory unit 55 as well as a number of inputs and outputs for interfacing with various sensors and systems coupled to the engine 12. The control circuit 50, is illustratively microprocessor-based, although this disclosure contemplates other embodiments in which the control circuit 50 may alternatively be or include a general purpose or application specific control circuit capable of operation as will be described hereinafter. In any case, the control circuit 50 may be a known control unit sometimes referred to as an electronic or engine control module (ECM), electronic or engine control unit (ECU) or the like. Illustratively, the memory 55 of the control circuit 50 has stored therein one or more sets of instructions that are executable by the control circuit 50, as will be described in greater detail hereinafter, to estimate the mass flow rate of exhaust gas moving through the EGR conduit 42.

The control circuit 50 includes a number of inputs for receiving signals from various sensors or sensing systems associated with system 10. The control circuit 50 is generally operable in a conventional manner to sample the signals produced by the various sensors or sensing systems and to processes the sampled signals to determine the associated engine operating condition. For example, the system 10 includes an intake manifold pressure sensor 52 that is disposed in fluid communication with the intake manifold 14 and that is electrically connected to an intake manifold pressure input, IMP, of the control circuit 50 via a signal path 54. The intake manifold pressure sensor 52 may be of known construction, and is operable to produce a pressure signal on the signal path 54 that corresponds to the pressure of a "charge" flowing into the intake manifold 14. The term "charge," for purposes of this disclosure is generally defined as the gas flowing into the intake manifold 14 via the conduit 22 that is generally made up of fresh air supplied to the intake conduit 22, e.g., via the turbocharger compressor 18, combined with recirculated exhaust gas supplied by the EGR conduit 42. Although the intake manifold pressure sensor 52 is illustrated in FIG. 1 as being positioned in fluid communication with the intake manifold 14, the sensor 52 may alternatively be positioned in fluid communication with the intake conduit 22 downstream of the junction of the EGR conduit 42 and the intake conduit 22. In any case, the memory 55 of the control circuit 50 includes one or more sets of conventional instructions that are executable by the control circuit 50 to process the intake manifold pressure signal produced by the intake manifold pressure sensor 52 and determine instantaneous intake manifold pressure therefrom.

The system 10 further includes an engine speed and position sensor 56 that is electrically connected to an engine speed and position input, ESP, of the control circuit 50 via a signal path 58. The engine speed and position sensor 56 is conventional and is operable to produce a signal from which the rotational speed of the engine, ES, and the position of the engine, EP, relative to a reference position, can be conventionally determined by the control circuit 50. The engine position, EP, may, for example, be or include an angle of the engine crankshaft (not shown), i.e., crank angle, relative to a reference crank angle, e.g., top-dead-center (TDC) of a specified one of the pistons (not shown). In one embodiment, the sensor 56 is a Hall effect sensor operable to sense engine speed and position by sensing passage thereby of a number of spaced-apart teeth formed on a gear or tone wheel that rotates synchronously with the engine crankshaft (not shown). In one example implementation, which should not be considered to be limiting in any way, the gear or tone wheel has a sufficient number of teeth that allows for detection by the sensor 56 of a tooth every 6 degrees of rotation. Alternatively, the engine speed and position sensor 56 may be any other known sensor operable as just described including, but not limited to, a variable reluctance sensor or the like. Alternatively still, the engine speed and position sensor 56 may be provided in the form of two separate sensors; one that senses only engine rotational speed and the other that senses only engine position. In any case, the memory 55 of the control circuit 50 includes one or more sets of conventional instructions that are executable by the control circuit 50 to process the engine speed and position signal produced by the engine speed and position sensor 56 and determine instantaneous engine speed and engine position therefrom.

The system 10 further includes an EGR cooler outlet temperature sensor 60 disposed in fluid communication with the EGR conduit 42 between the gas outlet of the EGR cooler 44 and the intake conduit 22, and electrically connected to an EGR cooler outlet temperature input, COT, of the control circuit 50 via a signal path 62. The intake manifold temperature sensor 48 may be of known construction, and is operable to produce a temperature signal on the signal path 50 that corresponds to the temperature of exhaust gas exiting the EGR cooler 44. The memory 55 of the control circuit 50 includes one or more sets of conventional instructions that are executable by the control circuit 50 to process the EGR cooler outlet temperature signal produced by the EGR cooler outlet temperature sensor 60 and determine instantaneous EGR cooler outlet temperature therefrom.

The system 10 further includes a differential pressure sensor, or $\Delta P$ sensor, 64 having one end that is fluidly coupled via a conduit 66 to the EGR conduit 42 adjacent to the exhaust gas outlet of the flow restriction 48, and that is fluidly coupled at its opposite end to the EGR conduit 42 adjacent to an exhaust gas inlet of the flow restriction 48 via a conduit 68. Alternatively, the $\Delta P$ sensor 64 may be fluidly coupled across another flow restriction structure disposed in-line with the EGR conduit 42, or across the EGR valve 46 in which case the flow restriction 48 may be omitted. In any case, the $\Delta P$ sensor 64 is electrically connected to a $\Delta P$ input of the control circuit 42 via signal a path 70, and is operable to produce a differential pressure signal on the signal path 70 that corresponds to the pressure differential across the flow restriction 48 or other flow restriction structure disposed in-line with the EGR conduit 48.

The $\Delta P$ sensor 64 is illustratively a wide bandwidth sensor that is capable of sampling the pressure differential across the flow restriction 48 at a rate that is high enough to capture instantaneous features of the pulsating nature of this pressure differential. The EGR flow pulses are excited by the intake and exhaust processes of the engine 12. As such, the dominant feature of the EGR mass flow is a peak flow rate resulting from cylinder blowdown events that occur during the engine exhaust process. Exhaust events associated with each cylinder of the engine cause corresponding instantaneous increases in the exhaust manifold pressure which, in turn, cause corresponding pulses of high EGR flow rate.

The pulses of high EGR flow rate are periodic with respect to angular displacement of the engine crankshaft. The corresponding crank-angle periodic pressure differential signal, $\Delta P$, has a spectral density function that varies with engine rotational speed just as the cylinder firing frequency is a function of engine rotational speed. Measurement and analysis of the $\Delta P$ signal has shown that this signal is well represented by a spectral density function which is truncated at two times the firing frequency of the engine 12. From a practical standpoint, the sampling rate of the pressure differential across the flow restriction 48 by the $\Delta P$ sensor 64 is selected to be at least 8-10 times the firing frequency of the engine 12. The $\Delta P$ sensor 64 must therefore be capable of sampling the pressure differential across the flow restriction 48 at a sampling rate of at least 8-10 times the firing frequency of the engine 12 over the entire range of possible engine rotational speeds. In one embodiment, for example, engine rotational speeds may range from near zero to 2500 RPM, although other engine rotational speed ranges are contemplated.

Using the above example of sampling the engine speed and position signal every 6 degrees of engine crank angle, it has been determined that a $\Delta P$ sensor 64 capable of sampling the pressure differential across the flow restriction 48 at the same rate provides for an adequate sampling of this pressure differential over one example engine speed range of up to about 2500 RPM. However, this should not be considered to be limiting in any way, and it will be understood that this disclosure contemplates embodiments in which the $\Delta P$ sensor 64 is configured to sample the pressure differential across the flow restriction 48 at faster or slower sampling rates. In any case, the memory 55 of the control circuit 50 includes one or more sets of conventional instructions that are executable by the control circuit 50 to process the pressure differential signal produced by the ΔP sensor 64 and determine therefrom the instantaneous pressure differential across the flow restriction 48.

Figure 2:
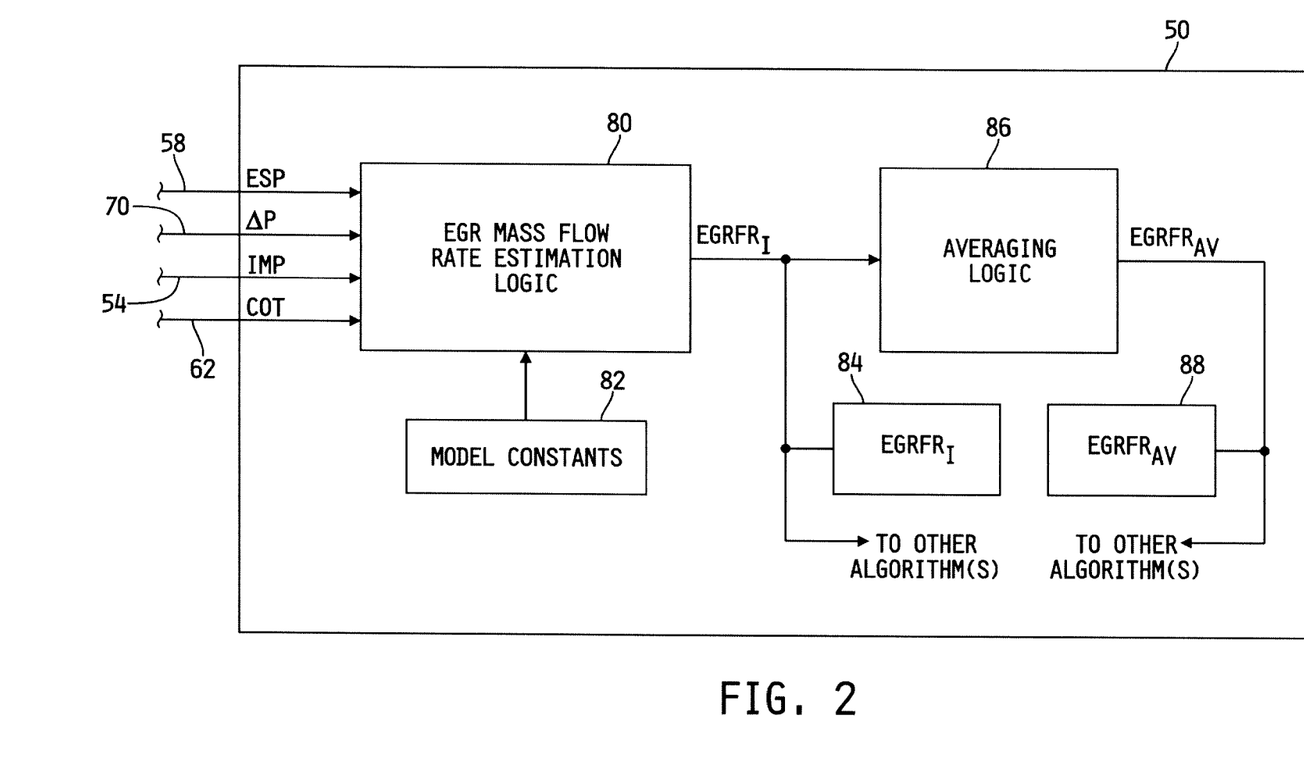
FIG. 2 is a block diagram of one illustrative embodiment of the control circuit of FIG. 1 configured to determine EGR mass flow rates.

Referring now to FIG. 2, one illustrative embodiment of some of the functional features of the control circuit 50 are shown that relate to the estimation of the mass flow rate of exhaust gas through the EGR conduit 42. It will be understood that the logic components shown in FIG. 2 are provided only by way of example, and that other conventional logic structures and/or techniques may be used to estimate the flow rate of exhaust gas through the EGR conduit 42 as described herein. Illustratively, the control circuit 45 illustrated in FIG. 2 includes an EGR mass flow rate estimation logic block 80 that receives as inputs the engine speed and position signal, ESP, the ΔP signal, the intake manifold pressure signal, IMP, and the EGR cooler outlet temperature signal, COT. The control circuit 50 further includes a model constants block 82 having a number of model constants stored therein. The EGR mass flow rate estimation logic illustratively includes instructions stored therein that are executable by the control circuit 50 to process ESP in a conventional manner to determine engine position, e.g., crank angle relative to a reference crank angle, to sample ΔP, IMP and COT at a rate determined by engine position, e.g., crank angle, and to then estimate the instantaneous EGR mass flow rate, $EGRFR_I$ as a function of the sampled ΔP, IMP and COT values.

The control circuit 50 further includes an instantaneous EGR mass flow rate storage location 84 in which any number of instantaneous EGR mass flow rate values, $EGRFR_I$, are stored. Illustratively, the instantaneous EGR mass flow rate values, $EGRFR_I$, are also made available to one or more other algorithms or instruction sets executed by the control circuit 50. The control circuit 50 further includes an averaging logic block 86 that is configured to receive the instantaneous EGR mass flow rate values, $EGRFR_I$, and compute an average, $EGRFR_{AV}$, of the most recent M instantaneous EGR mass flow rate values, where M may be any positive integer greater than 1. Illustratively, the averaging logic block 86 may be configured to compute $EGRFR_{AV}$ according to any conventional linear, non-linear, adaptive, weighted or unweighted averaging technique such as, for example, but not limited to, algebraic averaging, differential averaging, running or moving averaging, or the like. In any case, the control circuit 50 further includes an average EGR mass flow rate storage location 88 in which any number of average EGR mass flow rate values, $EGRFR_{AV}$, are stored. Illustratively, the one or more average EGR mass flow rate values, $EGRFR_{AV}$, are also made available to one or more other algorithms or instruction sets executed by the control circuit 50.

Figure 3:
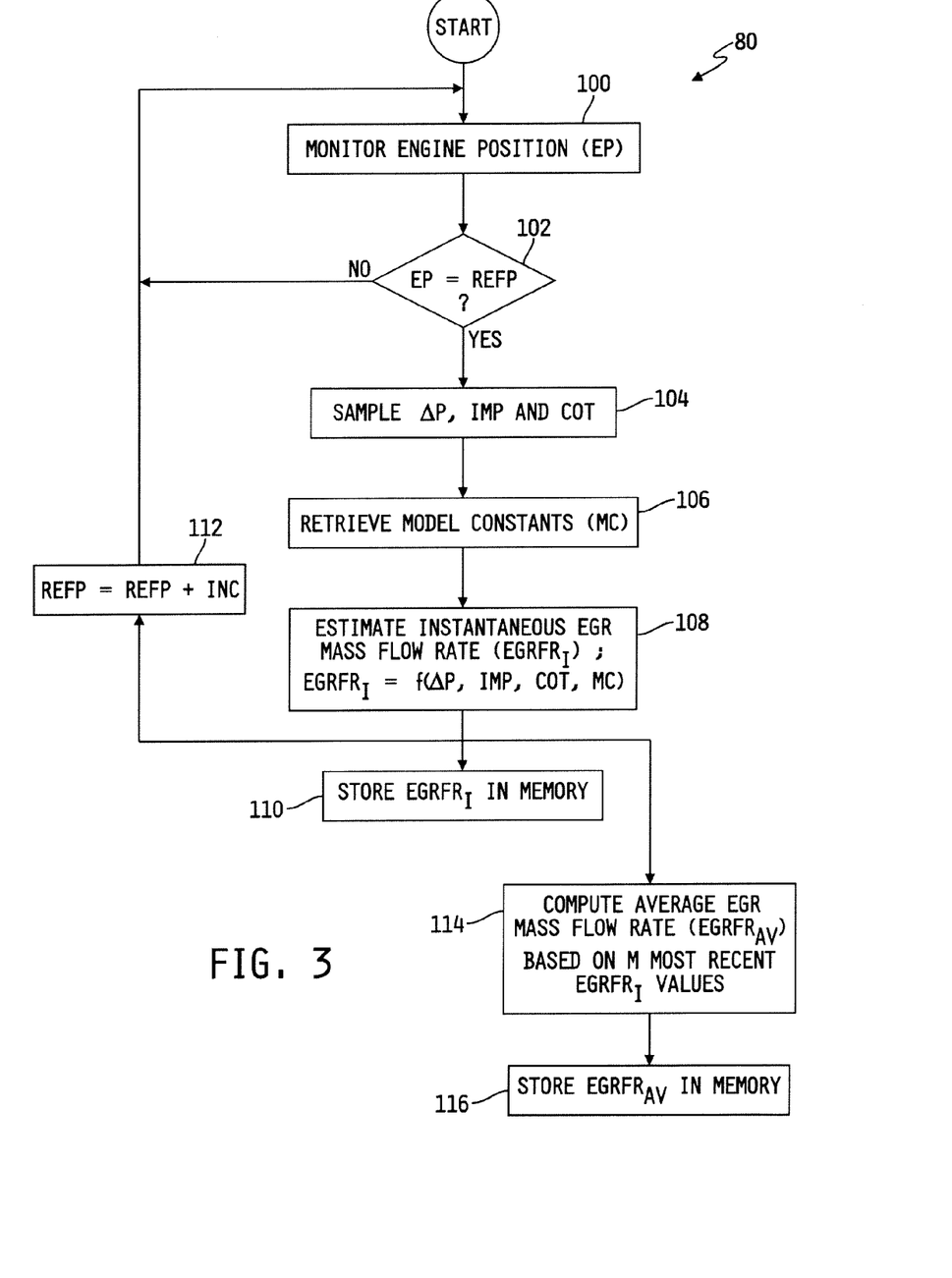
FIG. 3 is a flowchart of one illustrative embodiment of a process for estimating EGR mass flow rates.

Referring now to FIG. 3, a flowchart is shown of one illustrative embodiment of the process 80 for estimating the flow rate of exhaust gas through the EGR conduit 42. Illustratively, the process 80 represents the logic of the EGR mass flow rate estimation block 80, and is therefore provided in the form of instructions that are stored in the memory unit 55 and that are executable by the control circuit 50 to estimate the EGR mass flow rate. The process 80 begins at step 100 where the control circuit 50 is operable to monitor the engine position, EP. Illustratively, the control circuit 50 is operable at step 100 to monitor EP by monitoring the engine speed and position signal, ESP, produced by the engine speed and position sensor 56 on the signal path 58, and processing this signal in a conventional manner to determine EP. Thereafter at step 102, the control circuit 50 is operable to determine whether the engine position, EP, is equal to a predefined reference engine position, REFP. Illustratively, REFP corresponds to a position of the engine crank shaft (not shown) at the beginning of an engine cycle, although other reference engine positions are contemplated by this disclosure. The beginning of an engine cycle may be determined from ESP in a conventional manner, or may be stored in the memory 55. If, at step 102, the control circuit 50 determines that EP is not equal to REFP, execution of the process 80 loops back to step 100. If, on the other hand, the control circuit 50 determines at step 102 that EP=REFP, execution of the process 80 advances to step 104. Illustratively, steps 100 and 102 will generally be executed only until the reference position, REFP, is found after engine start up. Thereafter, the flow rate of exhaust gas through the EGR conduit 42 will be determined at predetermined increments of engine position as will be described in more detail below.

At step 104, the control circuit 50 is operable to sample the differential pressure signal, ΔP, on the signal path 70, the intake manifold pressure signal, IMP, on the signal path 54 and the EGR cooler outlet temperature signal, COT, on the signal path 62. Thereafter at step 106, the control circuit 50 is operable to retrieve the model constants, MC, from the memory location 82 (see FIG. 2). Thereafter at step 108, the control circuit 50 is operable to estimate the instantaneous EGR mass flow rate, $EGRFR_I$, as a function of ΔP, IMP, COT and MC. In one illustrative embodiment, the instantaneous EGR mass flow rate model stored in the memory 55 of the control circuit 50 and executed at step 108 of the algorithm 80 is given by the equation:

$$EGRFR = [C_D * A_{FR} * \text{sqrt}[(2*\Delta P * EGD)]/\text{sqrt}[1-(A_{FR}/A_U)^2]] \quad (1),$$

where $C_D$ is a discharge coefficient, e.g., 0.67, $A_{FR}$ is the cross-sectional flow area of the flow restriction 48, $A_U$ is the cross-sectional flow area of the EGR conduit 42 upstream of the flow restriction 48, EGD is the exhaust gas density. Illustratively, the exhaust gas density is given by the equation:

$$EGD = IMP/(R*COT) \quad (2),$$

where R is a gas constant, e.g., R=287 J/Kg deg K. Substituting equation (2) into equation (1) yields the following equation which is illustratively executed at step 108 of the algorithm 80:

$$EGRFR = [C_D * A_{FR} * \text{sqrt}[(2*\Delta P * IMP/(R*COT)]/\text{sqrt}[1-(A_{FR}/A_U)^2]] \quad (3).$$

In this illustrative embodiment, the model constants, MC, retrieved from the memory 55 at step 106 are $C_D$, $A_{FR}$, R and $A_U$.

In an alternate embodiment, the instantaneous EGR mass flow rate model stored in the memory 55 of the control circuit 50 and executed at step 108 of the algorithm 80 is given by the equation:

$$EGRFR = [C_D * A_T * (IMP-\Delta P)/\text{sqrt}(R*COT)] * [\Delta P^{1/\gamma}] * \text{sqrt}\{[2*\gamma/(\gamma-1)] * [1-\Delta P_J^{(\gamma-1)}]\} \quad (4),$$

where $C_D$ is the discharge coefficient and is a stored constant, e.g., 0.67, $A_T$ is the cross-sectional flow area of the flow restriction 48 and is a stored constant based on the physical dimensions of the flow restriction 48, R is a gas constant, e.g., R=287 J/Kg deg K and γ is the ratio of specific heat capacity at constant pressure to specific heat capacity at constant volume for the cylinder charge and is a stored constant, e.g., 1.35. In this alternate embodiment, the model constants, MC, retrieved from the memory 55 at step 106 are $C_D$, $A_T$, R and γ. It will be understood that this disclosure contemplates other embodiments in which the EGR flow rate estimation model includes more, fewer and/or different input parameters.

Following step 108, the control circuit 50 is operable at step 110 to store the estimated instantaneous EGR mass flow rate value, EGRFR$_I$, in the memory location 84. Also following step 108, the control circuit 50 is further operable at step 112 to increment the reference engine position value, REFP, by an increment value, INC. Using the example provided hereinabove, INC is illustratively 6 degrees such that the reference engine position, REFP, is set to 6 degrees advanced from the previous value of REFP. It will be understood, however, that INC may alternatively be set to other incremental angle values. In any case, the algorithm 80 loops from step 112 back to step 100.

The algorithm 80 also advances from step 108 to step 114 where the control circuit 50 is operable to compute an average EGR mass flow rate value, EGRFR$_{AV}$, based on the M most recent EGRFR$_I$ values, where M may be any positive integer greater than 1. The averaging technique used by the control circuit 50 at step 114 may illustratively be any conventional data averaging technique, non-limiting examples of which have been described hereinabove. Following step 114, the control circuit 50 is operable at step 116 to store the average EGR mass flow rate value, EGRFR$_{AV}$, in the memory location 88.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. A method of estimating an instantaneous flow rate of exhaust gas through an exhaust gas recirculation (EGR) conduit fluidly coupled between an exhaust manifold and an intake manifold of an internal combustion engine, the EGR conduit including an EGR cooler disposed in-line therewith, the method comprising:
    monitoring an operating position of the engine, and
    executing the following steps at each of a plurality of fixed increments of the engine position,
        sampling an EGR cooler outlet temperature corresponding to a temperature of gas exiting a gas outlet of the EGR cooler,
        sampling a pressure differential across a flow restriction disposed in-line with the exhaust gas conduit between the EGR cooler and the intake manifold,
        sampling an intake manifold pressure corresponding to fluid pressure within the intake manifold,
        estimating the instantaneous mass flow rate of exhaust gas through the EGR conduit based on the sampled pressure differential, the EGR cooler outlet temperature and the intake manifold pressure, and
        storing the estimated instantaneous mass flow rate of exhaust gas in a memory unit.

2. The method of claim 1 wherein the fixed increments are selected such that the sampling of the EGR cooler outlet temperature, the pressure differential across the flow restriction and the intake manifold pressure occur at least 8-10 times faster than a firing cycle of the engine.

3. The method of claim 1 further comprising determining an average EGR mass flow rate by averaging a number of values of the estimated instantaneous mass flow rate of exhaust gas through the EGR conduit.

4. The method of claim 3 further comprising storing the average EGR mass flow rate in the memory unit.

5. The method of claim 1 further comprising estimating the instantaneous mass flow rate of exhaust gas through the EGR conduit based on an instantaneous EGR mass flow rate model that includes a number of model constants.

6. The method of claim 5 wherein the instantaneous EGR mass flow rate model is:

$$EGRFR = [C_D * A_{FR} * \text{sqrt}[(2*\Delta P*IMP/(R*COT)]/\text{sqrt}[1-(A_{FR}/A_U)^2],$$

where EGRFR is the instantaneous mass flow rate of exhaust gas through the EGR conduit, COT is the EGR cooler outlet temperature, $\Delta P$ is the pressure differential across the flow restriction, IMP is the intake manifold pressure, and $C_D$, $A_{FR}$, R and $A_U$ comprise the number of model constants.

7. The method of claim 6 wherein $C_D$ is a charge density value, $A_{FR}$ is a cross-sectional flow area of the flow restriction, $A_U$ is a cross-sectional area of the EGR conduit and R is a gas constant.

8. The method of claim 5 wherein the instantaneous EGR mass flow rate model is:

$$EGRFR = [C_D * A_T * (IMP - \Delta P)/\text{sqrt}(R*COT)] * [\Delta P^{1/\gamma}] * \text{sqrt}\{[2*\gamma/(\gamma-1)] * [1-\Delta P^{(\gamma-1)}]\},$$

where EGRFR is the instantaneous mass flow rate of exhaust gas through the EGR conduit, COT is the EGR cooler outlet temperature, $\Delta P$ is the pressure differential across the flow restriction, IMP is the intake manifold pressure, and $C_D$, $A_T$, R and $\gamma$ comprise the number of model constants.

9. The method of claim 8 wherein $C_D$ is a charge density value, $A_T$ is a cross-sectional flow area of the flow restriction, R is a gas constant and $\gamma$ is a ratio of specific heat capacity at constant pressure to specific heat capacity at constant volume for a cylinder charge.

10. A system for estimating an instantaneous flow rate of exhaust gas through an exhaust gas recirculation (EGR) conduit fluidly coupled between an exhaust manifold and an intake manifold of an internal combustion engine, the system comprising:
    an EGR cooler disposed in-line with the EGR conduit,
    a temperature sensor configured to produce a temperature signal corresponding to a temperature of exhaust gas exiting the EGR cooler,
    a flow restriction disposed in-line with the EGR conduit between a gas outlet of the EGR cooler and the intake manifold of the engine,
    a differential pressure sensor fluidly configured to produce a differential pressure signal corresponding to a differential pressure across the flow restriction,
    a pressure sensor configured to produce a pressure signal corresponding to a pressure within the intake manifold of the engine,
    an engine position sensor configured to produce an engine position signal that corresponds to engine position relative to a reference position, and
    a control circuit including a memory having instructions stored therein that are executable by the control circuit to monitor the engine position signal and estimate at each of a plurality of fixed increments of the engine position the instantaneous mass flow rate of exhaust gas through the EGR conduit based on the temperature signal, the differential pressure signal and the pressure signal.

11. The system of claim 10 wherein the instructions stored in the memory include instructions that are executable by the control circuit to store the estimated instantaneous mass flow rate in the memory.

12. The system of claim 10 wherein the instructions stored in the memory include instructions that are executable by the control circuit to compute an average EGR mass flow rate value based on a number of most recently estimated values of the instantaneous mass flow rate of exhaust gas through the EGR conduit.

13. The system of claim 12 wherein the instructions stored in the memory include instructions that are executable by the control circuit to store the average EGR mass flow rate value in the memory.

14. The system of claim 10 wherein the differential pressure sensor is configured to sample the pressure differential across the flow restriction at a sampling rate that is at least 8-10 times faster than a firing cycle of the engine over a full range of engine rotational speeds.

15. The system of claim 10 wherein the instructions stored in the memory include instructions that are executable by the control circuit to estimate the instantaneous mass flow rate of exhaust gas through the EGR conduit according to the equation:

$$EGRFR = [C_D * A_{FR} * \mathrm{sqrt}[(2*\Delta P*IMP/(R*COT)]/\mathrm{sqrt}[1-(A_{FR}/A_U)^2],$$

where EGRFR is the instantaneous mass flow rate of exhaust gas through the EGR conduit, COT is the EGR cooler outlet temperature, $\Delta P$ is the pressure differential across the flow restriction, IMP is the intake manifold pressure, and $C_D$, $A_{FR}$, R and $A_U$ are constants.

16. The system of claim 15 wherein $C_D$ is a charge density value, $A_{FR}$ is a cross-sectional flow area of the flow restriction, $A_U$ is a cross-sectional area of the EGR conduit and R is a gas constant, and wherein the constants are stored in the memory unit, and wherein the instructions stored in the memory further include instructions that are executable by the control circuit to retrieve the constants from the memory unit prior to estimating the instantaneous flow rate of exhaust gas through the EGR conduit.

17. The system of claim 10 wherein the instructions stored in the memory include instructions that are executable by the control circuit to estimate the instantaneous mass flow rate of exhaust gas through the EGR conduit according to the equation:

$$EGRFR = [C_D * A_T * (IMP - \Delta P)/\mathrm{sqrt}(R*COT)]*[\Delta P^{1/\gamma}] * \mathrm{sqrt}\{[2*\gamma/(\gamma-1)]*[1-\Delta P_J^{(\gamma-1)}]\},$$

where EGRFR is the instantaneous mass flow rate of exhaust gas through the EGR conduit, COT is the EGR cooler outlet temperature, $\Delta P$ is the pressure differential across the flow restriction, IMP is the intake manifold pressure, and $C_D$, $A_T$, R and $\gamma$ are constants.

18. The system of claim 17 wherein $C_D$ is a charge density value, $A_T$ is a cross-sectional flow area of the flow restriction, R is a gas constant, and $\gamma$ is a ratio of specific heat capacity at constant pressure to specific heat capacity at constant volume for a cylinder charge, and wherein the constants are stored in the memory unit, and wherein the instructions stored in the memory further include instructions that are executable by the control circuit to retrieve the constants from the memory unit prior to estimating the instantaneous flow rate of exhaust gas through the EGR conduit.

* * * * *